(12) United States Patent
Schoonmaker et al.

(10) Patent No.: US 11,417,168 B2
(45) Date of Patent: Aug. 16, 2022

(54) METHOD AND SYSTEM FOR DISPLAY ASSEMBLY HINGING

(71) Applicant: ARISTOCRAT TECHNOLOGIES AUSTRALIA PTY LIMITED, North Ryde (AU)

(72) Inventors: Rena Schoonmaker, Las Vegas, NV (US); Bruce Urban, Las Vegas, NV (US); Matthew McKay, Henderson, NV (US); Noel Voloh, Sydney (AU); Robert Wand, Elgin, IL (US); Gary Strahinic, Sandy, UT (US)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 0 days.

(21) Appl. No.: 16/951,892

(22) Filed: Nov. 18, 2020

(65) Prior Publication Data

US 2021/0074118 A1    Mar. 11, 2021

Related U.S. Application Data

(60) Continuation of application No. 16/514,565, filed on Jul. 17, 2019, now Pat. No. 10,861,280, which is a
(Continued)

(51) Int. Cl.
*G07F 17/32* (2006.01)
*F16M 11/06* (2006.01)
*F16M 13/00* (2006.01)

(52) U.S. Cl.
CPC ......... *G07F 17/3211* (2013.01); *F16M 11/06* (2013.01); *G07F 17/3216* (2013.01);
(Continued)

(58) Field of Classification Search
CPC . G07F 17/3211; G07F 17/3216; F16M 11/06; F16M 2200/02; F16M 13/00; F16M 2200/04
(Continued)

(56) References Cited

U.S. PATENT DOCUMENTS 6,019,332 A    2/2000  Sweere
6,962,528 B2  11/2005  Yokota
(Continued)

FOREIGN PATENT DOCUMENTS

JP    2004309680 A    11/2004
TW     200930929 A     7/2009

OTHER PUBLICATIONS

AU Examination Report for AU Application No. 2018204608, dated Jun. 14, 2019, 7 pages.
(Continued)

*Primary Examiner* — Muhammad Ijaz
(74) *Attorney, Agent, or Firm* — Armstrong Teasdale LLP (57) ABSTRACT

An overhead display assembly includes a display monitor coupled to a monitor tray. The monitor tray is positionable in an operational position and a maintenance position. A support stanchion has an anchoring part, a coupling part, and a stanchion body extending from the anchoring part to the coupling part. The anchoring part is coupleable to a fixed vertical or horizontal supporting structure. A counter-balanced hinging mechanism has one or more pivots upon which monitor tray is configured to rotate with respect to said support stanchion. A force producing device is configured to apply a variable amount of force to the monitor tray based upon a position of the display monitor, the variable amount of force being at least a force sufficient to maintain
(Continued)

the monitor tray stationary in an intermediate position between the operational position and the maintenance position.

20 Claims, 9 Drawing Sheets

Related U.S. Application Data division of application No. 15/721,168, filed on Sep. 29, 2017, now Pat. No. 10,445,973.

(52) U.S. Cl.
CPC ......... *F16M 13/00* (2013.01); *F16M 2200/02* (2013.01); *F16M 2200/04* (2013.01)

(58) Field of Classification Search
USPC ............. 248/917–924, 596, 130, 397, 185.1, 248/278.1, 284.1; 463/46
See application file for complete search history.

(56) References Cited

U.S. PATENT DOCUMENTS

| | | | |
|---|---|---|---|
| 7,252,277 | B2 | 8/2007 | Sweere |
| 8,724,037 | B1* | 5/2014 | Massey ................. F16M 11/18 |
| | | | 348/836 |
| 9,679,435 | B2 | 6/2017 | Schrementi |
| 10,565,830 | B1* | 2/2020 | Georgilas ............ G07F 17/3267 |
| 2005/0277477 | A1* | 12/2005 | Hajder ................ G07F 17/3216 |
| | | | 463/46 |
| 2006/0070210 | A1 | 4/2006 | Amdahl |
| 2006/0154732 | A1 | 7/2006 | Tastad |
| 2006/0199647 | A1 | 9/2006 | Anderson |
| 2006/0281559 | A1 | 12/2006 | Luciano |
| 2006/0287112 | A1* | 12/2006 | Mallory ................. G07F 17/32 |
| | | | 463/46 |
| 2007/0021218 | A1* | 1/2007 | Okada ................ G07F 17/3206 |
| | | | 463/47 |
| 2008/0113821 | A1* | 5/2008 | Beadell ............... G07F 17/3216 |
| | | | 463/46 |
| 2008/0119289 | A1 | 5/2008 | Lind |
| 2009/0253486 | A1* | 10/2009 | Nagano ............... G07F 17/3211 |
| | | | 463/20 |
| 2010/0240462 | A1 | 9/2010 | Yeh |
| 2017/0092040 | A1 | 3/2017 | Higgins |
| 2017/0270744 | A1 | 9/2017 | Inoue |
| 2018/0040203 | A1* | 2/2018 | Winters ............. G07F 17/3225 |
| 2018/0053373 | A1* | 2/2018 | Goldstein ........... G07F 17/3213 |
| 2018/0253933 | A1 | 9/2018 | Borissov |
| 2019/0012874 | A1* | 1/2019 | Goldstein ........... G07F 17/3218 |
| 2019/0320543 | A1 | 10/2019 | Wand |
| 2020/0242886 | A1* | 7/2020 | Patel ........................ E05D 3/16 |

OTHER PUBLICATIONS

Office Action dated Oct. 29, 2020 for U.S. Appl. No. 17/001,642 (pp. 1-11).
Notice of Allowability dated Sep. 16, 2020 for U.S. Appl. No. 16/514,532 (pp. 1-7).
Corrected Notice of Allowability dated Sep. 30, 2020 for U.S. Appl. No. 16/514,532 (pp. 1-8).
Notice of Allowance dated Oct. 5, 2020 for U.S. Appl. No. 16/514,565 (pp. 1-16).
Office Action dated Mar. 19, 2020, for U.S. Appl. No. 16/514,532 (pp. 1-12).
Australian Examination Report for App No. AU2018204608, dated May 27, 2020, 6 pages.
Office Action dated Jun. 11, 2020 for U.S. Appl. No. 16/514,565 (pp. 1-12).
Notice of Allowance dated Jun. 18, 2020 for U.S. Appl. No. 16/514,532 (pp. 1-10).
Corrected Notice of Allowability dated Aug. 13, 2020 for U.S. Appl. No. 16/514,532 (pp. 1-8).
Notice of Allowance dated Feb. 19, 2021 for U.S. Appl. No. 17/001,642 (pp. 1-7).
Australian Examination Report No. 1 for App. No. AU2020244604, dated Oct. 11, 2021, 2 pages.

* cited by examiner

METHOD AND SYSTEM FOR DISPLAY ASSEMBLY HINGING

CROSS REFERENCE TO RELATED APPLICATION

This application is a continuation of and claims priority to U.S. patent application Ser. No. 16/514,565, filed Jul. 17, 2019, which is a divisional of U.S. patent application Ser. No. 15/721,168, filed Sep. 29, 2017 and entitled "METHOD AND SYSTEM FOR DISPLAY ASSEMBLY HINGING," each of which is hereby incorporated by reference in their entireties.

BACKGROUND

The embodiments described herein relate generally to electronic equipment cabinets and, more particularly, to electronic gaming machines (EGM) including counterbalanced hinge assemblies for securing one or more displays proximate the EGM.

At least some known EGMs include a display, also referred to as a monitor or a screen, within a cabinet housing at least a portion of the EGM. Additionally, other displays may also be associated with the EGM and be located proximate the EGM, but may not form an integral part of the EGM. For example, a lower display may be located next to the EGM and an upper display may be located above the EGM. The upper display may be positioned high above a flooring surface on which the EGM is positioned that maintenance personnel may have difficulty reaching the display comfortably without the use of a step ladder or other elevating device. For example, replacing and/or installing the display may require a maintenance technician lifting a monitor, which may weigh in excess of fifty pounds, above the level of his head to position the monitor in its mounted position. Climbing the elevating device while carrying the display may comprise the work safety of the maintenance technician.

BRIEF DESCRIPTION

In one aspect, a method of positioning a monitor frame using a counter-balanced hinging mechanism coupled to the monitor frame and seating a display monitor within the monitor frame is provided. The method includes rotating the monitor frame into an approximately horizontal orientation relative to a support surface using the counter-balanced hinging mechanism, where the counter-balanced hinging mechanism may include at least one arm linkage assembly, and at least one bias member coupled to the at least one arm linkage assembly. The at least one bias member may be configured to apply a variable amount of force to the at least one arm linkage assembly. The method may also include aligning an outer edge of the display monitor with an inner surface of the monitor frame, translating the display monitor to a seated position within the monitor frame, and rotating the monitor frame into an approximately vertical orientation relative to the support surface using the counter-balanced hinging mechanism by applying a manual force to the monitor frame.

In yet another aspect, a system for receiving and supporting a display monitor is provided. The system includes a monitor frame configured to receive and support the display monitor, and a counter-balanced hinging mechanism coupled to the monitor frame. The counter-balanced hinging mechanism includes at least one arm linkage assembly configured to permit pivoting of the monitor frame between an approximately horizontal orientation and an approximately vertical orientation. The counter-balanced hinging mechanism also includes at least one bias member coupled to the at least one arm linkage assembly, where the at least one bias member is configured to apply a variable amount of force to maintain the monitor frame stationary in any of a plurality of intermediate orientations between the approximately vertical orientation and the approximately horizontal orientation.

In yet another aspect, a counter-balanced hinging mechanism configured to couple to and support a monitor frame in a plurality of intermediate orientations between a maintenance orientation and an operational orientation is provided. The counter-balanced hinging mechanism includes at least one arm linkage assembly configured to permit pivoting of the monitor frame between the maintenance orientation and the operational orientation. The counter-balanced hinging mechanism also includes at least one bias member coupled to the at least one arm linkage assembly, where the at least one bias member is configured to apply a variable amount of force to maintain the monitor frame stationary in any of a plurality of intermediate orientations between the maintenance orientation and the operational orientation.

BRIEF DESCRIPTION OF THE DRAWINGS

FIGS. 1-9 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to physical and methodical embodiments of a monitor hinging mechanism in industrial, commercial, and residential applications.

Embodiments of a monitor hinging mechanism are described herein. The monitor hinging mechanism provides an improved motion controlling hinge device, which effectively counterbalances the weight of a display member mounted in a monitor frame throughout an operative arc of its movement; automatically compensating for the variable torque (due to gravity) effects on the monitor frame as it swings between a horizontally extending and a vertically standing attitude with respect to the floor surface.

The following description refers to the accompanying drawings, in which, in the absence of a contrary representation, the same numbers in different drawings represent similar elements.

Figure 1:
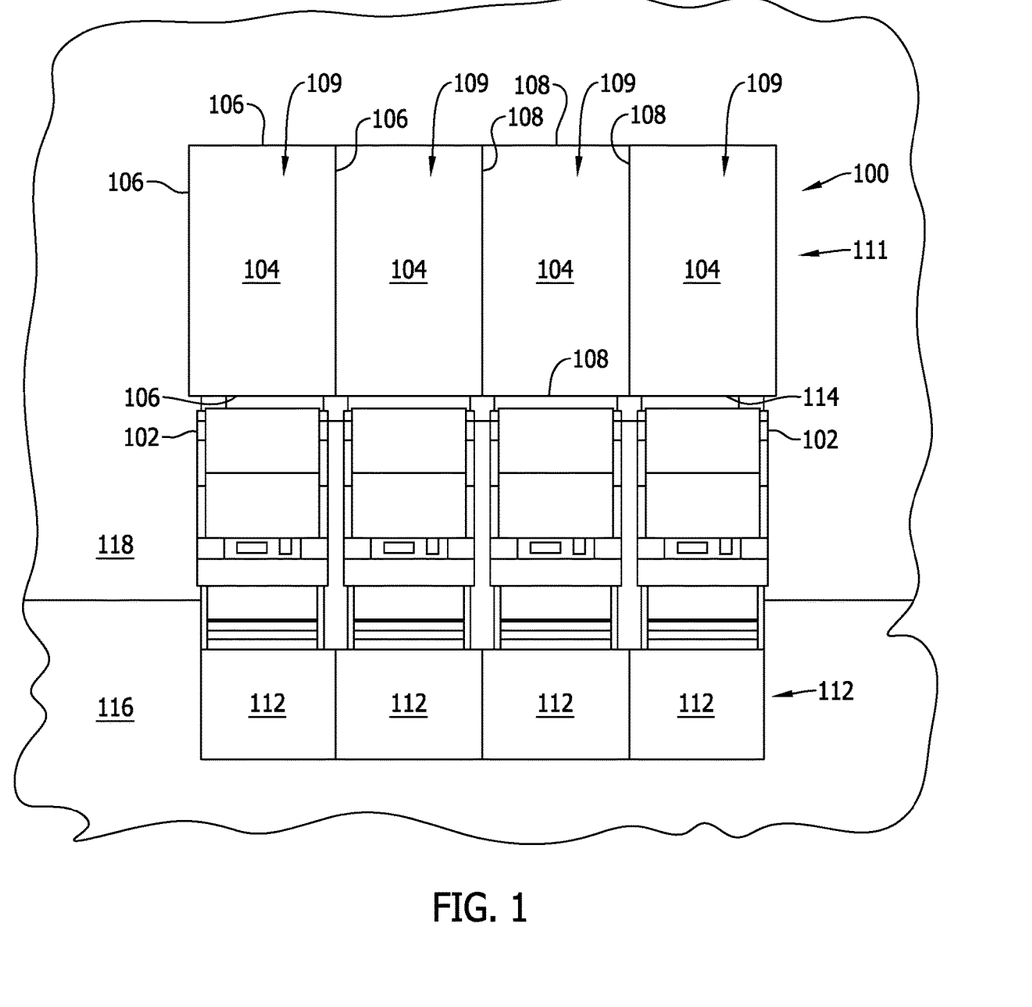
FIG. 1 is a front elevation view of an overhead display assembly for an electronic machine.

FIG. 1 is a front elevation view of an overhead display assembly 100 for an electronic machine 102. In the example embodiment, electronic machine 102 is a plurality of electronic gaming machines (EGMs) ganged together in an island formation. Plurality of electronic gaming machines are the type of electronic machine at which players play games with game play media, and which pay out game play media to players as a prize. In various embodiments, electronic machine 102 may be a single stand-alone electronic machine 102 or may have any number of electronic machine 102 associated with each other by proximity whether in an island formation or not.

Overhead display assembly 100 includes a display monitor 104 supported in a monitor frame 106 at least partially surrounding display monitor 104. Monitor frame 106 includes a plurality of legs 108 coupled around an opening 109 through which a respective display monitor 104 is viewable. Overhead display assembly 100 is configurable in several different arrangements. Each display monitor 104 may be associated with a respective one of a plurality of EGMs 102 as shown in FIG. 1.

Figure 2:
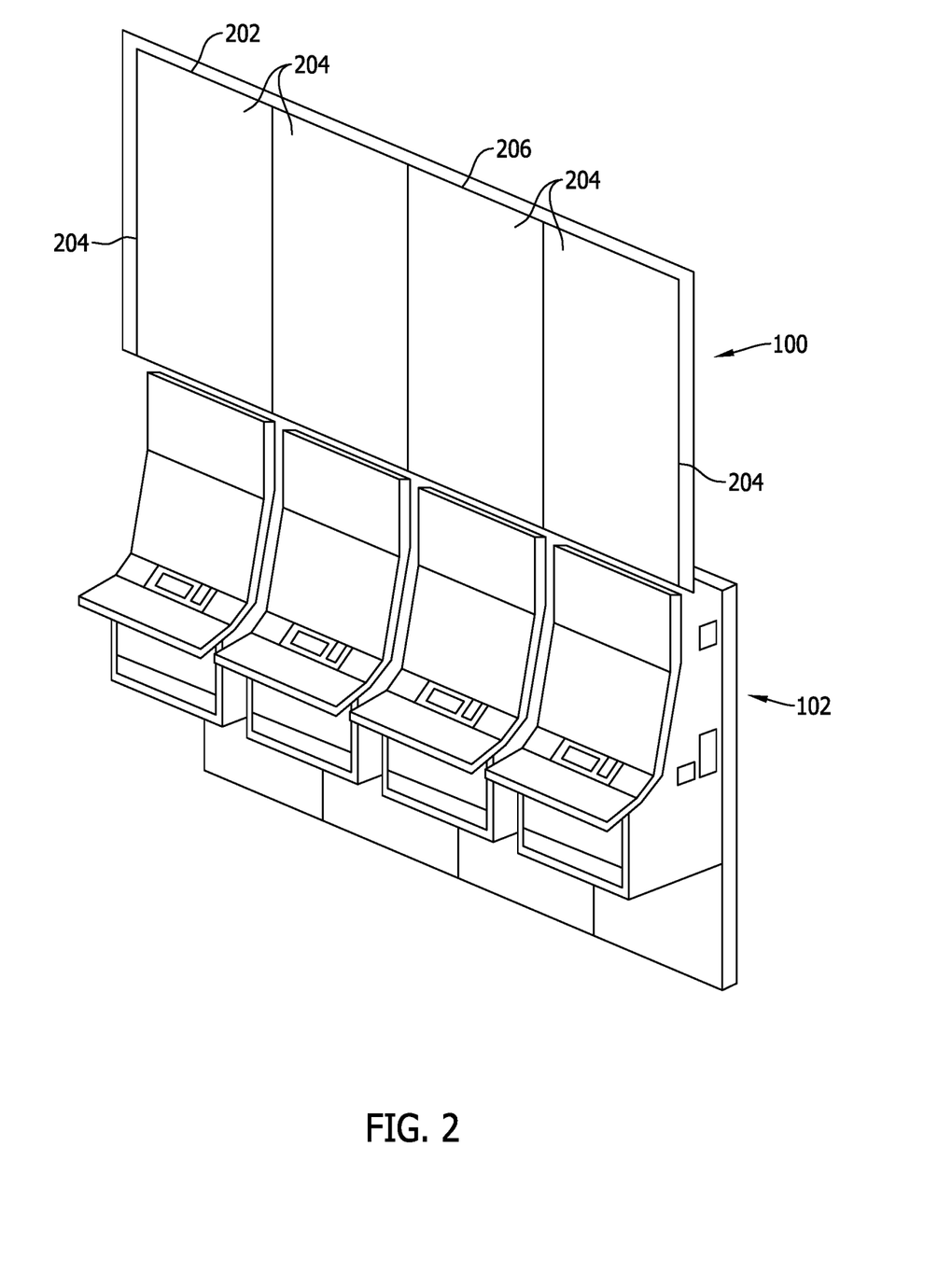
FIG. 2 is perspective view of overhead display assembly incorporating a single display monitor for plurality of EGMs.

A single display monitor 104 may be associated with more than one or all of the plurality of EGMs 102 as shown in FIG. 2. In the example embodiment, overhead display assembly 100 extends vertically above the plurality of EGMs 102 in an operational position 111 as shown. As will be shown below, overhead display assembly 100 is not supported by plurality of EGMs 102 or by a pedestal 112 on which plurality of EGMs 102 are positioned and supported. Rather, overhead display assembly 100 is supported separately from plurality of EGMs 102 and pedestal 112 using a support stanchion 114 that can only be partially seen in FIG. 1. In various embodiments, support stanchion 114 is supported by a floor surface 116 or a wall surface 118. In other embodiments, support stanchion 114 is supported by a false floor assembly 120 (not shown in FIG. 1).

FIG. 2 is perspective view of overhead display assembly 100 incorporating a single display monitor 204 for plurality of EGMs 102. Overhead display assembly 100 may include a plurality of display monitors ganged together using a linear fixture 202 extending across an edge of each of the plurality of display monitors 204. In various embodiments, linear fixture 202 includes an attraction lighting device 206.

Figure 3:
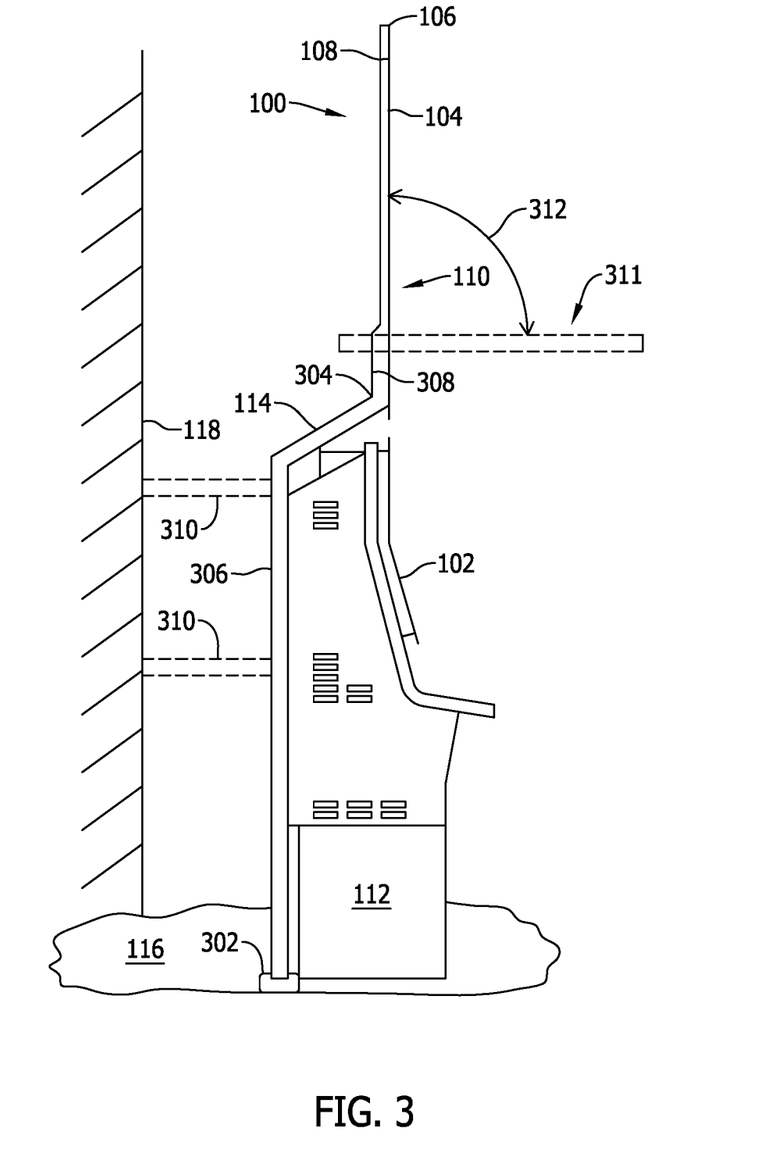
FIG. 3 is a side elevation view of overhead display assembly in operable relation to plurality of EGMs and pedestal.

FIG. 3 is a side elevation view of overhead display assembly 100 in operable relation to plurality of EGMs 102 and pedestal 112. In the example embodiment, support stanchion 114 includes a first anchor end 302, a second coupling end 304, and a stanchion body 306 extending therebetween. First anchor end 302 is configured to couple to a supporting structure, such as floor surface 116. Second coupling end 304 is configured to couple to a counter-balanced hinging mechanism 308. In other embodiments, support stanchion 114 is coupled to and supported by one or more braces 310 coupled to wall surface 118, in which case support stanchion 114 may not extend to floor surface 116. Counter-balanced hinging mechanism 308 permits monitor frame 106 and display monitor 104 to be positioned in operational position 111, a maintenance position 311, or any of a plurality of intermediate positions between operational position 111 and maintenance position 311 along an angle 312. In the example embodiment, angle 312 is greater than 30° such as, but not limited to approximately 90°. In some embodiments, operational position 111 may be other than vertical, which would typically make angle 312 an acute angle, or an angle less than 90°. Additionally, monitor frame 106 and display monitor 104 may be positioned such that angle 312 is obtuse, or greater than 90°. As will be discussed in greater detail below counter-balanced hinging mechanism 308 is configured to balance the force applied to monitor frame 106 and display monitor 104 by counter-balanced hinging mechanism 308 and a moment of monitor frame 106 and display monitor 104 at any of the plurality of intermediate positions between operational position 111 and maintenance position 311. Such counter-balancing of forces and moment permits monitor frame 106 and display monitor 104 to be manually translated between operational position 111 and maintenance position 311 and maintain the intermediate position when the manual urging is ceased.

Figure 4:
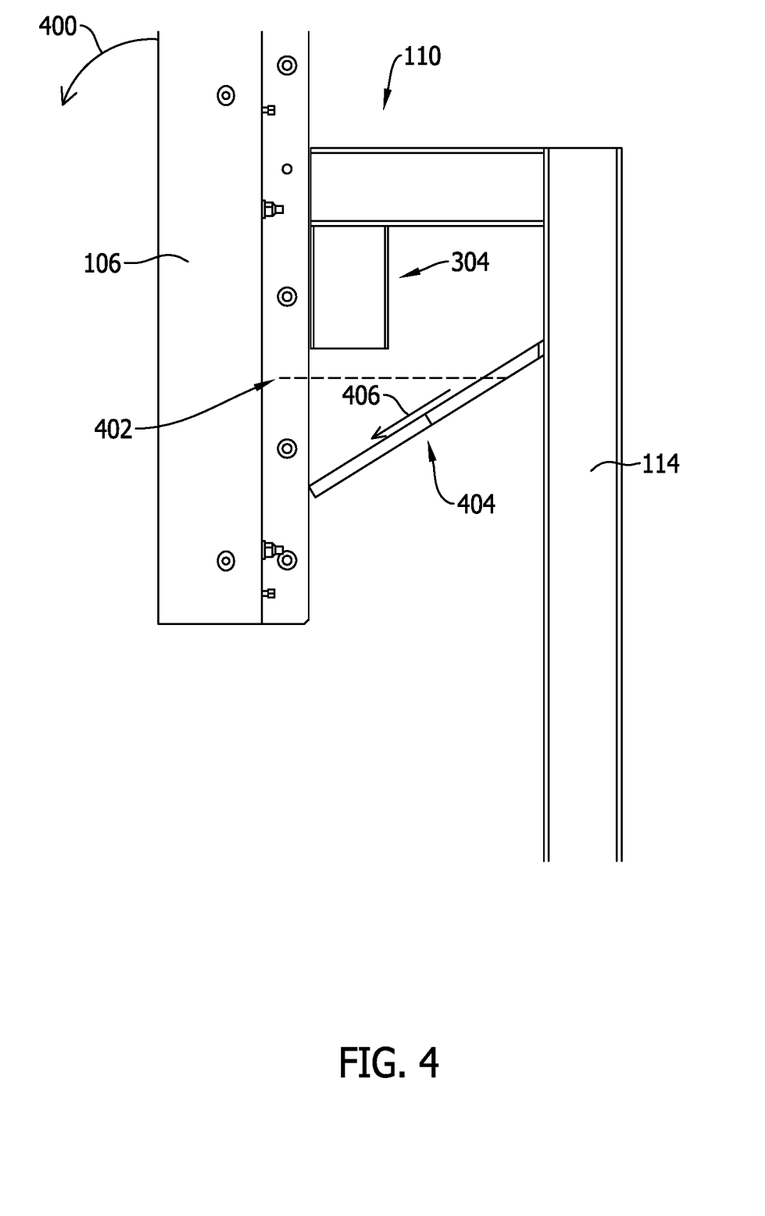
FIG. 4 is a side elevation view of a portion of overhead display assembly illustrating a lower portion of the monitor frame in the operational position and the second coupling end of the support stanchion.
Figure 5:
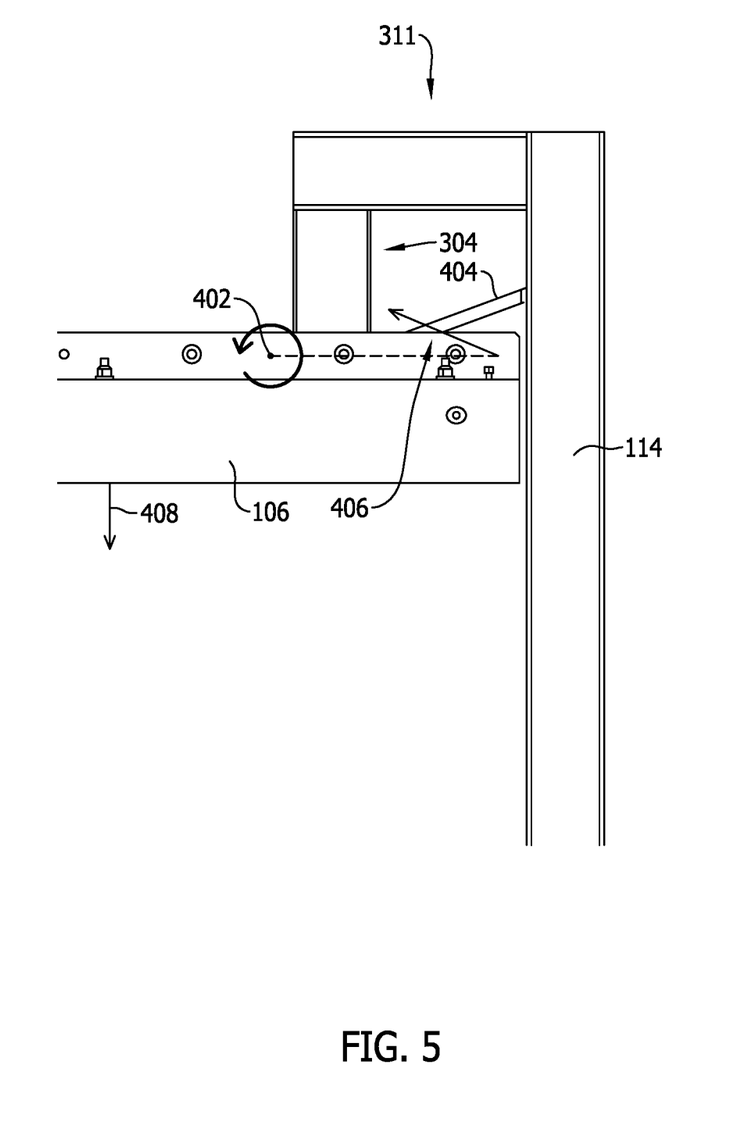
FIG. 5 is the side elevation view of a portion of the overhead display assembly illustrating a lower portion of the monitor frame in the maintenance position and the second coupling end of the support stanchion.

FIG. 4 is a side elevation view of a portion of overhead display assembly 100 illustrating a lower portion of monitor frame 106 in operational position 111 and second coupling end 304 of support stanchion 114. FIG. 5 is the side elevation view of a portion of overhead display assembly 100 illustrating a lower portion of monitor frame 106 in maintenance position 311 and second coupling end 304 of support stanchion 114. In this embodiment, counter-balanced hinging mechanism 308 includes a single hinge pivot axis 402 and is counter-balanced using a strut 404, such as a fluid cylinder and piston arrangement. Other force producing devices may also be used for force-balancing, for example, electrical and fluidic linear actuators, bias members, including linear springs, torsion springs, and the like. Strut 404 is sized and positioned to generate a balanced-force 406 that is predetermined to counter the moment 408 of monitor frame 106 between operational position 111 and maintenance position 311 and to "lock-in" monitor frame 106 at operational position 111 and maintenance position 311.

Figure 6:
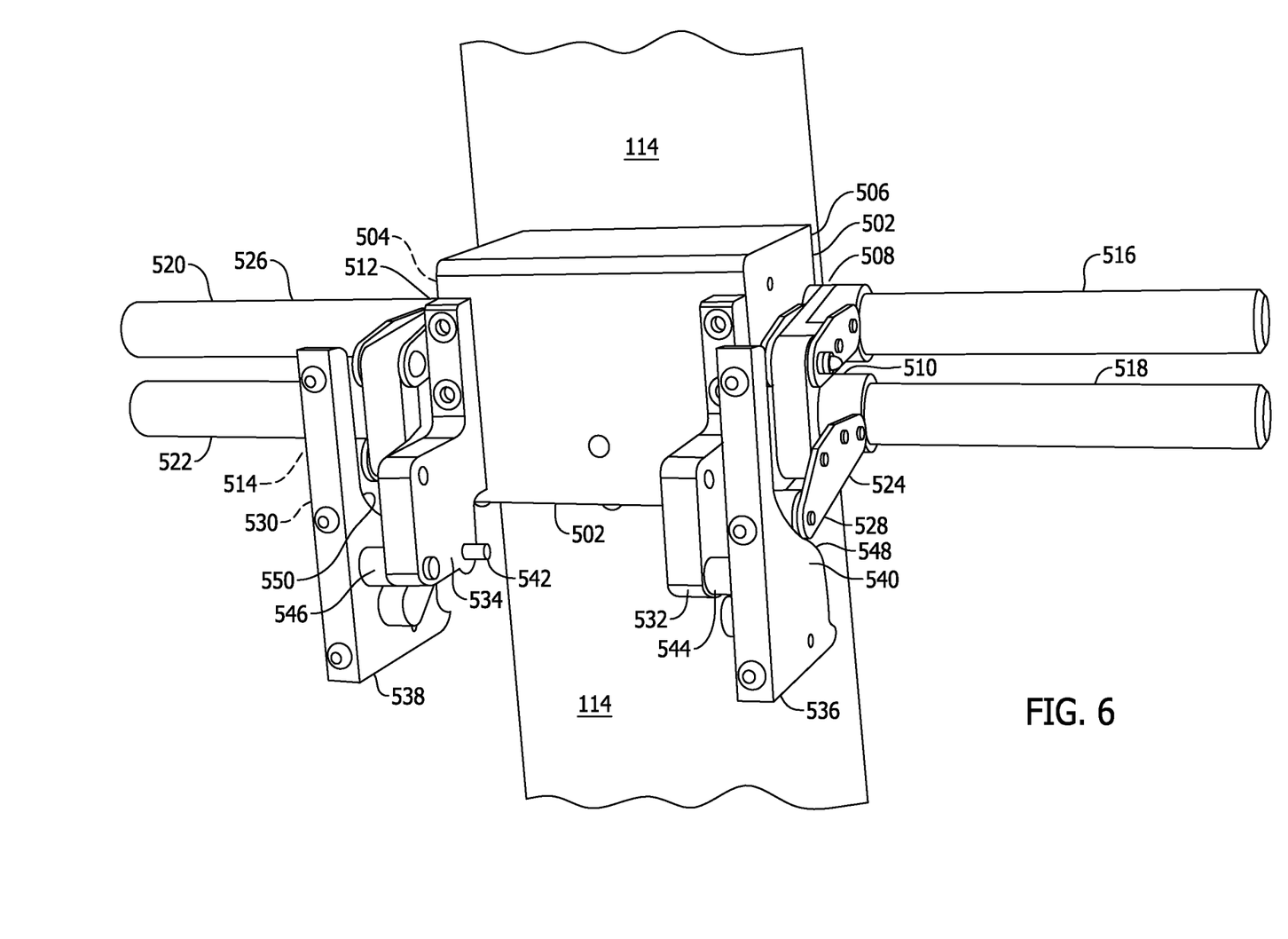
FIG. 6 is a perspective view of a counter-balanced hinging mechanism in accordance with another example embodiment of the present disclosure.
Figure 7:
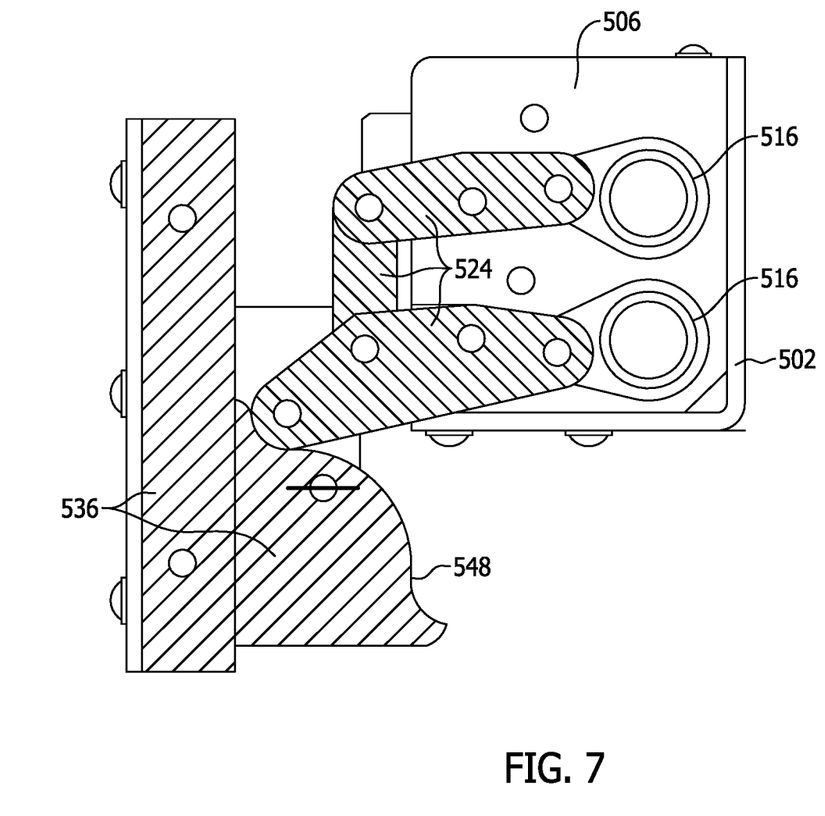
FIG. 7 is a side elevation view of the counter-balanced hinging mechanism in the operational position.
Figure 8:
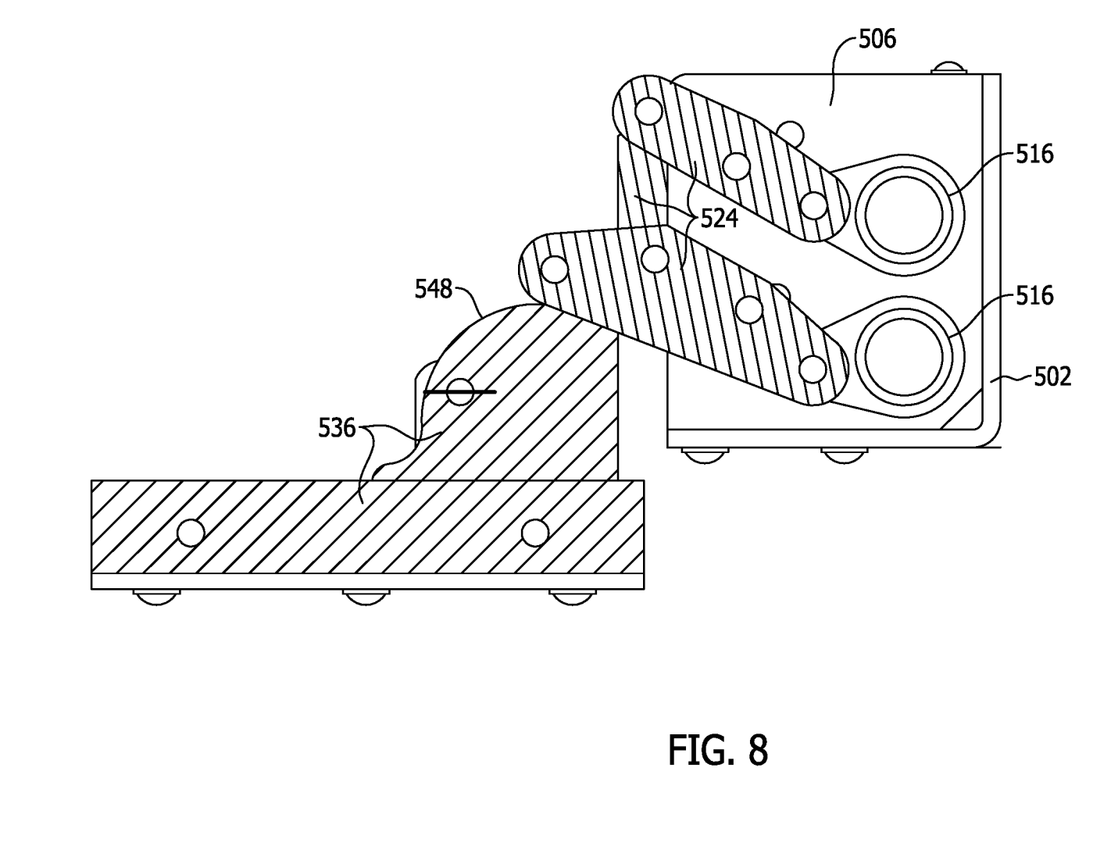
FIG. 8 is a side elevation view of the counter-balanced hinging mechanism in the maintenance position.

FIG. 6 is a perspective view of a counter-balanced hinging mechanism 308 in accordance with another example embodiment of the present disclosure. FIG. 7 is a side elevation view of counter-balanced hinging mechanism 308 in operational position 110. FIG. 8 is a side elevation view of counter-balanced hinging mechanism 308 in maintenance position 311. In this embodiment, counter-balanced hinging mechanism 308 includes an L-shaped support bracket 502 configured to couple to support stanchion 114. A first and a second pivot plate 504, 506 are coupled to L-shaped support bracket 502 edge-wise and each includes a pair of apertures 508, 510, 512, 514. Apertures 508, 510, 512, 514 are configured to receive a bias member, such as, a torsion bar or torsion spring style torque engine configured to apply a variable amount of force to arm linkage assembly 524 and/or arm linkage assembly 526, the variable amount of force maintains monitor frame 106 stationary in an intermittent position between operational position 110 and maintenance position 311 respective torsion bar or torsion spring style torque engine 516, 518, 520, 522. A first arm linkage assembly 524 operatively couples torque engines 516, 518, together and a second arm linkage assembly 526 operatively couples torque engines 520, 522 together. A cam roller 528, 530 extends outwardly from respective ones of first arm linkage assembly 524 and second arm linkage assembly 526. A hinge plate 532, 534 is coupled edgewise to a respective pivot plate 504, 506. A cam 536, 538 is coupled to monitor frame 106 (shown in FIGS. 1 and 4) and to a respective hinge plate 532, 534 through a pin 540, 542 and a spacer 544, 546. Cam roller 528, 530 is configured to engage a cam surface 548, 550 of cam 536, 538.

In various embodiments, overhead display assembly 100 includes counter-balanced hinging mechanism 308 having a single pivot point as shown in FIGS. 4 and 5. In other embodiments, overhead display assembly 100 includes counter-balanced hinging mechanism 308 having at least two pivot points as shown in FIGS. 6, 7, and 8.

Figure 9:
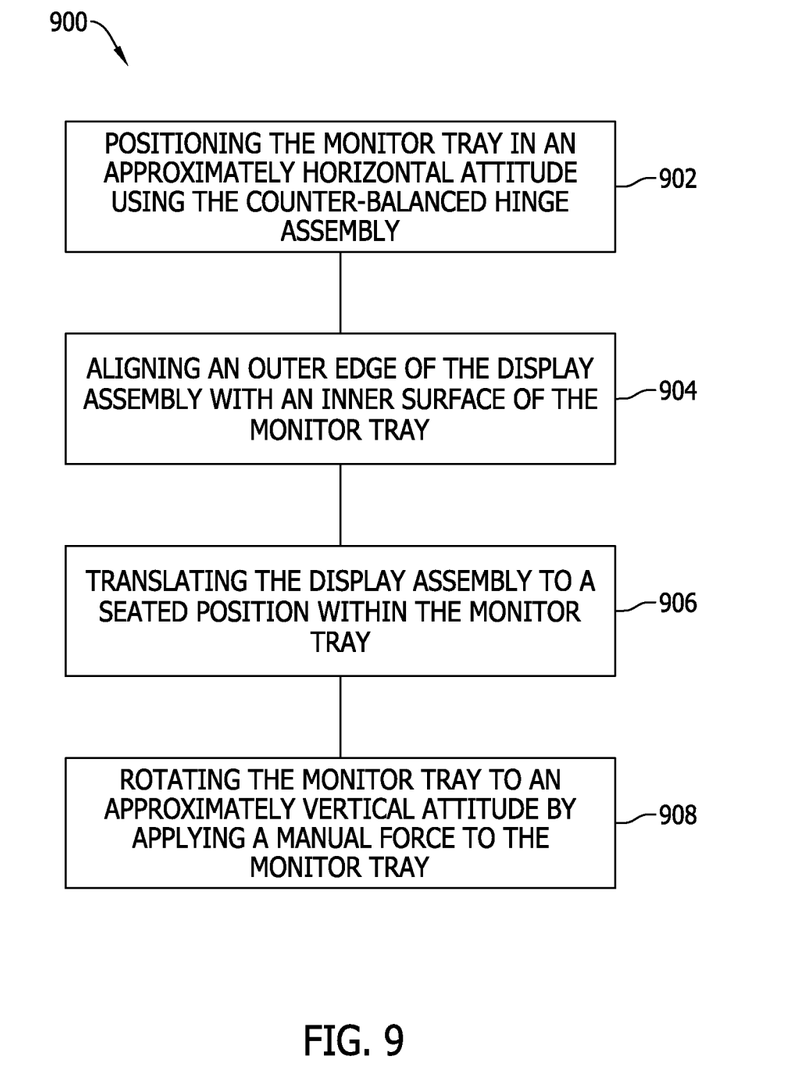
FIG. 9 is a flowchart of a method of maintaining a display assembly for an electronic machine wherein the display assembly includes a monitor frame coupled to a counter-balanced hinge assembly.

FIG. 9 is a flowchart of a method 900 of maintaining a display assembly for an electronic machine wherein the display assembly includes a monitor frame coupled to a counter-balanced hinge assembly. In the example embodiment, method 900 includes positioning 902 the monitor frame in an approximately horizontal attitude with respect to the floor surface using the counter-balanced hinge assembly, aligning 904 an outer edge of the display assembly with an inner surface of the monitor frame, translating 906 the display assembly to a seated position within the monitor frame, and rotating 908 the monitor frame to an approximately vertical attitude with respect to the floor surface by applying a manual force to the monitor frame.

Optionally, method 900 further includes maintaining the monitor frame in an intermediate position between the approximately horizontal attitude with respect to the floor surface and the approximately vertical attitude with respect to the floor surface using the counter-balanced hinge assembly when the manual force is removed at the intermediate position. Method 900 also may include applying a counter-balancing force to the monitor frame by the counter-balanced hinge assembly that is equal to a moment of the monitor frame. In various embodiments, the display assembly includes a plurality of monitor frames coupled to the counter-balanced hinge assembly and method 900 further includes ganging the plurality of monitor frames together using a fixture coupled to a periphery of the plurality of monitor frames. Method 900 also may include applying a counter-balancing force to the monitor frame by the counter-balanced hinge assembly, which includes applying a counter-balancing force to the monitor frame using at least one of a torsion bar, a torsion spring, and a piston/cylinder device.

It will be appreciated that the above embodiments that have been described in particular detail are merely example or possible embodiments, and that there are many other combinations, additions, or alternatives that may be included. Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

While the disclosure has been described in terms of various specific embodiments, it will be recognized that the disclosure can be practiced with modification within the spirit and scope of the claims.

The above-described embodiments of a counter-balanced hinging mechanism provide a cost-effective and reliable means for safely accessing a component that is elevated above a floor surface for maintenance activities. More specifically, the methods and systems described herein facilitate translating a display monitor from a vertical operational position to a horizontal maintenance position using minimal manual effort and a hold-in-place feature that maintains an intermediate position of the display monitor when the manual effort is removed. In addition, the above-described methods and systems facilitate maintaining the display monitor in the operational or maintenance position by requiring an additional start-off effort to begin movement of display frame. As a result, the methods and systems described herein facilitate maintenance of electronic machines in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A pedestal system including a pedestal, the pedestal comprising:
   a display monitor coupled to a monitor tray, a monitor tray configured to be positionable in an operational position and a maintenance position, the maintenance position being angularly displaced from the operational position;
   a support stanchion comprising an anchoring part, a coupling part, and a stanchion body extending from the anchoring part to the coupling part, the anchoring part configured to couple to a fixed vertical or horizontal supporting structure; and
   a counter-balanced hinging mechanism coupled to the coupling part and the monitor tray, the counter-balanced hinging mechanism comprising:
      one or more pivots upon which the monitor tray is configured to rotate with respect to said support stanchion; and
      a force producing device configured to apply a variable amount of force to the monitor tray based upon a position of the display monitor, the variable amount of force being at least a force sufficient to maintain the monitor tray stationary in an intermediate position between the operational position and the maintenance position.

2. The overhead display assembly according to claim 1, wherein an anchoring part is configured to couple to the fixed vertical supporting structure, and the fixed vertical supporting structure is a vertical wall.

3. The overhead display assembly according to claim 1, wherein an anchoring part is configured to couple to the fixed horizontal supporting structure, and the fixed horizontal supporting structure is a horizontal floor.

4. The overhead display assembly according to claim 1, wherein the force producing device is one or more of an electrical linear actuator, a fluidic linear actuator, a linear spring, or a torsion spring.

5. The overhead display assembly according to claim 1, wherein the one or more pivots comprises a hinge having a single rotational axis.

6. The overhead display assembly according to claim 1, wherein the operational position is substantially vertical and the maintenance position is rotated substantially 90 degrees from the operational position.

7. The overhead display assembly according to claim 1, wherein the support stanchion further comprises at least one brace extending between the anchoring part and the fixed vertical or horizontal supporting structure.

8. The overhead display assembly according to claim 1, wherein the monitor tray is configured to hold a plurality of adjacent display monitors.

9. The overhead display assembly according to claim 1, wherein the anchoring part comprises a first anchoring portion configured to be coupled to the fixed vertical supporting structure and a second anchoring portion configured to be coupled to the fixed horizontal supporting structure.

10. A method of positioning a display monitor, comprising:
   coupling the display monitor to a monitor tray, the monitor tray configured to be positionable in an operational position and a maintenance position, the maintenance position being angularly displaced from the operational position;
   coupling an anchoring part of a support stanchion to a fixed vertical or horizontal supporting structure, the support stanchion comprising the anchoring part, a coupling part, and a stanchion body extending from the anchoring part to the coupling part; and
   coupling the coupling part to a counter-balanced hinging mechanism and coupling the counter-balanced hinging mechanism to the monitor tray, wherein the counter-balanced hinging mechanism comprising includes:
      one or more pivots upon which the monitor tray is configured to rotate with respect to said support stanchion; and
      a force producing device configured to apply a variable amount of force to the monitor tray based upon a position of the display monitor, the variable amount of force being at least a force sufficient to maintain the monitor tray stationary in an intermediate position between the operational position and the maintenance position.

11. The method of positioning the display monitor according to claim 10, wherein coupling the anchoring part of the support stanchion includes coupling the anchoring part of the support stanchion to the fixed vertical supporting structure, and the fixed vertical supporting structure is a vertical wall.

12. The method of positioning the display monitor according to claim 10, wherein coupling the anchoring part of the support stanchion includes coupling the anchoring part of the support stanchion to the fixed horizontal supporting structure, and the fixed horizontal supporting structure is a horizontal floor.

13. The method of positioning the display monitor according to claim 10, wherein counter-balancing a display monitor includes applying the variable amount of force using one or more of an electrical linear actuator, a fluidic linear actuator, a linear spring, or a torsion spring.

14. The method of positioning the display monitor according to claim 10, wherein applying the force to reposition the display monitor includes applying a force sufficient to rotate the display monitor from the operational position that is substantially vertical to the maintenance position being substantially 90 degrees from the operation position.

15. The method of positioning the display monitor according to claim 10, wherein the monitor tray is configured to hold a plurality of adjacent display monitors, and applying the force to the monitor tray includes applying a force sufficient to reposition the plurality of adjacent display monitors.

16. A system for receiving and supporting a display monitor, the system comprising:
   the display monitor;
   a monitor frame configured to receive and support the display monitor; and
   a support stanchion comprising an anchoring part, a coupling part, and a stanchion body extending from the anchoring part to the coupling part, the anchoring part configured to couple to a fixed vertical or horizontal supporting structure; and
   a counter-balanced hinging mechanism coupled to the coupling part and a monitor tray, the counter-balanced hinging mechanism comprising:
      one or more pivots upon the monitor tray is configured to rotate with respect to said support stanchion; and
      a force producing device configured to apply a variable amount of force to the monitor tray based upon a position of the display monitor, the variable amount of force being at least a force sufficient to maintain the monitor tray stationary in an intermediate position between an operational position and a maintenance position.

17. The system according to claim 16, wherein an anchoring part is configured to couple to the fixed vertical supporting structure, and the fixed vertical supporting structure is a vertical wall.

18. The system according to claim 16, wherein the an anchoring part is configured to couple to the fixed horizontal supporting structure, and the fixed horizontal supporting structure is a horizontal floor.

19. The system according to claim 16, wherein the force producing device is one or more of an electrical linear actuator, a fluidic linear actuator, a linear spring, or a torsion spring.

20. The system according to claim 16, wherein the one or more pivots comprises a hinge having a single rotational axis.

* * * * *